US009781714B2

(12) United States Patent
Lorca Hernando

(10) Patent No.: US 9,781,714 B2
(45) Date of Patent: Oct. 3, 2017

(54) METHOD AND SYSTEM FOR ASSISTING USER DEVICES IN PERFORMING INTERFERENCE CANCELLATION IN OFDMA WIRELESS COMMUNICATION NETWORKS

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 201 days.

(21) Appl. No.: 14/871,075

(22) Filed: Sep. 30, 2015

(65) Prior Publication Data

US 2016/0095095 A1    Mar. 31, 2016

(30) Foreign Application Priority Data

Sep. 30, 2014  (EP) .................................... 14382376

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/0413* (2013.01); *H04B 17/345* (2015.01); *H04J 11/005* (2013.01); *H04L 1/0003* (2013.01); *H04L 1/0009* (2013.01); *H04L 1/22* (2013.01); *H04L 5/0023* (2013.01); *H04L 27/2613* (2013.01)

(58) Field of Classification Search
CPC ......... H04L 5/00; H04L 27/26; H04L 5/0023; H04W 72/04
See application file for complete search history.

(56) References Cited

U.S. PATENT DOCUMENTS

2010/0110874 A1   5/2010 Kang et al.
2010/0111014 A1   5/2010 Kang et al.
(Continued)

FOREIGN PATENT DOCUMENTS

WO       2013/133599       9/2013

OTHER PUBLICATIONS

European Search Report for corresponding EP Application No. 143823763, dated Mar. 31, 2015.

*Primary Examiner* — Lakeram Jangbahadur
(74) *Attorney, Agent, or Firm* — Gardner, Linn, Burkhart & Flory, LLP

(57) ABSTRACT

A system and method are provided for assisting user devices in performing OFDMA downlink interference cancellation, in which an interfering base station transmits a downlink signal in a first slot and a second slot, both slots including cell reference signals (CRSs) for physical channel estimation, the CRS of the second slot is modified to indicate encoded values of parameters characterizing the physical channel according to an encoding procedure, the slots are received by a served user device that detects the physical channel parameters carried by dedicated control signalling and encodes them by the encoding procedure, an unchanged CRS is reconstructed, and the slots are received by an interfered user device obtaining the encoded values and comparing to parameter patterns indicating absence of modifications in the CRSs, wherein if the encoded values are different from the patterns, the interfered user device decodes them to perform interference cancellation of the downlink signal.

11 Claims, 9 Drawing Sheets

(51) Int. Cl.
*H04B 7/0413* (2017.01)
*H04L 1/00* (2006.01)
*H04L 1/22* (2006.01)
*H04B 17/345* (2015.01)
*H04J 11/00* (2006.01)
*H04L 27/26* (2006.01)

(56) References Cited

U.S. PATENT DOCUMENTS

2010/0226415 A1    9/2010   Mehta et al.
2015/0049693 A1    2/2015   Seo et al.

METHOD AND SYSTEM FOR ASSISTING USER DEVICES IN PERFORMING INTERFERENCE CANCELLATION IN OFDMA WIRELESS COMMUNICATION NETWORKS

FIELD OF THE INVENTION

The present invention has its application within the telecommunication sector, especially, deals with the field of interference cancellation (IC) in Orthogonal Frequency-Division Multiple Access (OFDMA) wireless communication systems and, in particular, with IC techniques at user devices aided by specific network procedures in OFDMA wireless networks.

BACKGROUND OF THE INVENTION

Long-Term Evolution (LTE) is the next step in cellular Third-Generation (3G) systems, which represents basically an evolution of present mobile communications standards, such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth. LTE-Advanced (LTE-A), an evolution of LTE, is being standardized in LTE Release 10 and beyond. It is aimed at fulfilling International Mobile Telecommunications (IMT)-Advanced requirements, whose capabilities go beyond those of IMT-2000 and include enhanced peak data rates to support advanced services and applications (100 Mbps for high mobility, and 1 Gbps for low mobility).

In LTE systems, there are five types of downlink reference signals defined as follows:
Cell-specific reference signal (CRS)
Multicast-Broadcast Single Frequency Network (MB-SFN) reference signal
UE-specific reference signal (DM-RS)
Positioning reference signal (PRS)
CSI reference signal (CSI-RS)

There is one reference signal transmitted per downlink antenna port.

Cell(-specific) Reference Signals (CRSs) are transmitted in all downlink subframes in a cell supporting Physical Downlink Shared Channel (PDSCH) transmission. Cell-specific reference signals are transmitted on one or several of antenna ports 0 to 3. To facilitate the estimation of the channel characteristics, LTE uses cell reference signals (pilot symbols) inserted in both time and frequency. These pilot symbols provide an estimate of the channel at given locations within a subframe. Through interpolation it is possible to estimate the channel across an arbitrary number of subframes. A cell-specific reference signal is transmitted in each physical antenna port and it is used for both demodulation and measurement purpose. Cell reference signals are used for cell search and initial acquisition, downlink channel estimation for coherent demodulation/detection at the UE, and downlink channel quality measurements.

One of the biggest issues generally perceived as critical for LTE deployments is inter-cell interference. Orthogonal Frequency-Division Multiple Access (OFDMA) does not provide any protection when users receive significant interference from adjacent cells operating at the same carrier frequency. Specific interference cancellation (IC) techniques are therefore being explored at both the network and the devices side. The latter case relies on the support of advanced IC techniques at the device, like so-called Successive Interference Cancellation (SIC) or Parallel Interference Cancellation (PIC), which are of fast-growing interest. Indeed some of the solutions proposed by 3GPP for interference coordination in LTE-A rely upon device support of SIC/PIC capabilities.

SIC techniques at devices require detailed knowledge of the physical parameters describing the observed interference, like the modulation and coding scheme (MCS), in order to be able to decode and cancel interference prior to obtaining the desired signals.

Control channels IC usually benefit from pre-defined MCS formats, therefore relieving the network from signalling the applicable MCS to the devices. However data channels employ dynamic MCS formats to the different users in a subframe basis, and devices cannot therefore assume any a priori MCS format thus complicating SIC operation.

Multiple-Input Multiple-Output (MIMO) receivers currently implement SIC techniques for efficient decoding of the different streams in spatial multiplexing, usually in the form of Minimum Mean-Squared Error (MMSE)-SIC receivers. However these techniques only address inter-stream interference between the spatial streams intended for a given user, but are not able to cope with interfering signals coming from other neighbour cells.

Therefore, there is a need in the state of the art for more efficient ways of assisting user devices in performing advanced inter-cell interference cancellation techniques.

SUMMARY OF THE INVENTION

According to aspects of the present invention, a system and a method are provided to assist user devices in performing advanced IC techniques, by introducing changes in the downlink Cell Reference Signals (CRSs) in order to provide these devices with essential information required by the advanced interference cancellation techniques.

The present invention introduces suitable changes in the way that downlink Cell Reference Signals (CRSs) are transmitted (e.g., by LTE base stations) in each cell of an OFDMA wireless network, in order to aid devices in performing interference cancellation (IC) techniques that require suitable reconstruction of the interfering signals for subsequent cancellation. The proposed changes consist of including additional parameters required by advanced receivers for interference cancellation in user devices.

The rationale for the proposed modifications on the CRS stems from the requirements of advanced receivers. Advanced IC techniques require extra information for appropriate removal of interference from LTE data channels. In particular, SIC and PIC receivers require three parameters for effectively detecting and removing interference:

The modulation and coding scheme (MCS) in use by each of the interfering signals present in the Resource Blocks (RBs) where the interfered user expects to receive the desired signal.

The Medium Access Control (MAC) Radio Network Temporary Identifier (RNTI) corresponding to each of the interfering signals present in the RBs where the interfered user expects to receive the desired signal.

Any type of RNTI can be specified including those values reserved for control information (C-RNTI, SPS-C-RNTI, M-RNTI, SI-RNTI, P-RNTI or RA-RNTI).

The Redundancy Version (RV) corresponding to the Hybrid Automatic Repeat Request (HARQ) retransmission, as determined by the base station for incremental redundancy.

These parameters are required because SIC and PIC receivers try to detect, decode and reconstruct the interfering information for subsequent subtraction from the received signal in an iterative way. MCS is required for proper channel decoding; RNTI is required for coping with the user-dependent scrambling operation before channel decoding; and RV is needed for coping with the Rate Matching operation prior to decoding.

This invention therefore proposes to incorporate these parameters in the form of differential information included within the signals that comprise the CRS, for each of the RBs occupied by each interfering signal, for detection by interfered devices. In an embodiment of the invention, the proposed differential information is included in the form of additional phase changes on the real and imaginary parts of the modified cell reference signals, within the resource blocks reserved for each particular channel and user.

According to a first aspect of the present invention, a method for assisting user devices in OFDMA wireless networks is disclosed and comprises the following steps:
transmitting by the interfering base station a downlink signal in a first slot and a second slot of a radio subframe, the first slot and the second slot including cell reference signals for physical channel estimation;
modifying the phases of the cell reference signal included in the second slot, the phase modifications indicating encoded values of parameters which characterize the physical channel according to an encoding procedure;
receiving the first slot and the second slot of the radio subframe by the served user device, the served user device:
detecting the parameters which characterize the physical channel as carried by dedicated control signalling applied to said physical channel,
encoding the detected parameters according to the encoding procedure,
reconstructing an unchanged cell reference signal for carrying the encoded detected parameters,
prior to physical channel estimation, removing the modified phases by comparing the modified cell reference signal received in the second slot with the reconstructed unchanged cell reference signal;
receiving the first slot and the second slot of the radio subframe by the interfered user device, the interfered user device:
obtaining the encoded values by comparing the phases of the cell reference signals included in the second slot and in the first slot,
for assisting in interference cancellation of the downlink signal from the interfering base station, comparing the encoded values with parameter patterns which indicate absence of modifications in the cell reference signals, and
if the encoded values are different from the parameter patterns which indicate absence of modifications in the cell reference signals (309, 310), decoding the encoded values by the interfered user device and performing interference cancellation of the downlink signal from the interfering base station by using the decoded values.

In a second aspect of the present invention, a system of assisting user devices for OFDMA wireless networks is disclosed. The system comprises at least one (interfering) base station, at least one served user device connected to said at least one base station, and at least one interfered user device connected to another (neighbour) base station from a neighbour cell and suffering from significant interference from the, at least one, aforementioned, interfering base station. The system comprises means for implementing the method described before, which are:
at the interfering base station,
transmitting means for transmitting a downlink signal in a first slot and a second slot of a radio subframe, both slots including cell reference signals for physical channel estimation,
a generator block (for generating a modified cell reference signal in the second slot which includes phase modifications indicating encoded values of parameters which characterize the physical channel according to an encoding procedure;
at the served user device,
receiving means for receiving the first slot and the second slot:
a downlink channel detector for detecting the parameters which characterize the physical channel as carried by dedicated control signalling applied to said physical channel, encoding the detected parameters according to the encoding procedure and reconstructing an unchanged cell reference signal for carrying the encoded detected parameters;
an eliminator block for removing the phase modifications by comparing the modified cell reference signal received in the second slot with the reconstructed unchanged cell reference signal;
a channel estimator operating after the eliminator block;
at the interfered user device,
receiving means for receiving the first and the second slots,
a phase comparator for comparing the phases of the cell reference signals included in the second slot and in the first slot to obtain the encoded values from the phase comparator,
interference cancellation means for applying interference cancellation of the downlink signal from the interfering base station based on a comparison of the encoded values with parameter patterns indicating absence of modifications in the cell reference signals.

In a last aspect of the present invention, a computer program is disclosed, comprising computer program code means adapted to perform the steps of the described method, when said program is run on proccesing means of a network entity (base station or user terminal) of a OFDMA network, said proccesing means being a computer, a digital signal processor, a field-programmable gate array (FPGA), an application-specific integrated circuit (ASIC), a micro-processor, a micro-controller, or any other form of programmable hardware.

In the context of this invention, mobility of the interfered user device must not be very high in order to allow estimation of Modulation and Coding Scheme (MCS), the Radio Network Temporary Identifier (RNTI) and the Redundancy Version (RV) through differential detection. In particular, it is required that the frequency response of the radio channel between the interfering base station and the interfered device does not change substantially over a time period of half a slot (e.g., 0.5 ms in LTE). User devices with very high speeds are not able to exploit the signalled values for interference cancellation, while the majority of users at lower speeds are able to take advantage of them. The user speed can be estimated at the device by a number of techniques, such as Global Positioning System (GPS) receivers, Doppler spread estimation from downlink signals, or speed estimation from the number of cell changes over a given time period, among others. If the user speed exceeds the above limit, the device shall not rely on the decoded MCS, RV and RNTI values for performing IC techniques, and apply instead some blind detection of IC parameters or even no IC at all.

The method in accordance with the above described aspects of the invention has a number of advantages with respect to prior art, which can be summarized as follows:

The present invention and the proposed changes in the CRSs can be exploited by interfered users whenever the channel frequency response between the user device and the interfering base station does not change substantially over a time period of half a slot. This requirement translates into a minimum channel coherence time (or a maximum Doppler frequency), which in turn gives a maximum user speed for applicability of the proposed signaling over the CRS. For example, in LTE the standard density of four CRS signals in 1 ms allows for a maximum user speed of about 500 km/h at 2 GHz; consequently, in order to achieve channel invariance in a time interval of 0.5 ms, the maximum user speed should be lower than approximately 250 km/h at 2 GHz. A maximum limit in user speed must be observed by devices willing to detect the signalled MCS, RV and RNTI values. Given that the Doppler frequency scales linearly with the carrier frequency $f_c$, the maximum user speed will be linearly reduced with the carrier frequency according to the following expression:

$$v_{max}(km/h) = 250 \cdot \frac{2}{f_c(GHz)}$$

However this limit is sufficiently high so as to not significantly restrict the application of the proposed invention in most practical cases The base stations need not be aware of whether the user speed is below the limits for application of the proposed invention.

Other main advantages of the proposed invention come from the enhanced downlink reception in LTE scenarios employing at least two transmit antennas, where overall performance is ultimately limited by inter-cell interference. While there are a number of proposals dealing with interference coordination in LTE, a lot of them rely on the support of advanced interference cancellation capabilities at devices. These IC techniques usually require prior knowledge of the physical characteristics of the interference, which for data channels comprise the Modulation and Coding Scheme (MCS), the Radio Network Temporary Identifier (RNTI) and the Redundancy Version (RV). While interference from control channels is usually easy to cancel due to a priori knowledge of its structure, data channels require some extra signaling from the network. This invention proposes to include such indications of MCS, RV and RNTI in a very simple way within LTE cell reference signals, for the most common case of using transmission mode 2, localized resource mapping and a minimum of 2 resource blocks. If these conditions are met, the proposed invention allows for very efficient decoding of MCS, RV and RNTI parameters characterizing the interfering channels, therefore enabling application of advanced IC techniques by devices suffering from significant inter-cell interference. Most practical LTE deployments meet such conditions for the majority of downlink traffic intended for macro cell users.

The proposed changes are beneficial for IC schemes since interference from wider bandwidth signals is in general much more harmful than from narrowband signals. In fact, the repetition of the resulting MCS, RV and RNTI encoded words can be applied over the number of resource blocks actually reserved for transmission. A total of $8 \cdot N_{RB}$ bits are available within the $N_{RB}$ resource blocks reserved for transmission. It is apparent that the higher the number of resource blocks, the higher the protection of the resulting encoded values.

The proposed changes can be undone by user devices in the own cell as the additional signaling is normally decoded through Physical Downlink Control Channel (PDCCH) with the aid of the unchanged reference signals in the first slot, and its effect can be properly removed from the modified cell reference signals in the second slot.

The proposed invention can also be applied for cancellation of the interference from downlink control information such as System Information Blocks, paging information or dedicated signaling. In this case the appropriate RNTI value must be considered in each case for decoding of the control information.

These and other objects, advantages and features of the invention will become apparent upon review of the following specification in conjunction with the drawings.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DESCRIPTION OF THE PREFERRED EMBODIMENTS

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-9.

Figure 1:
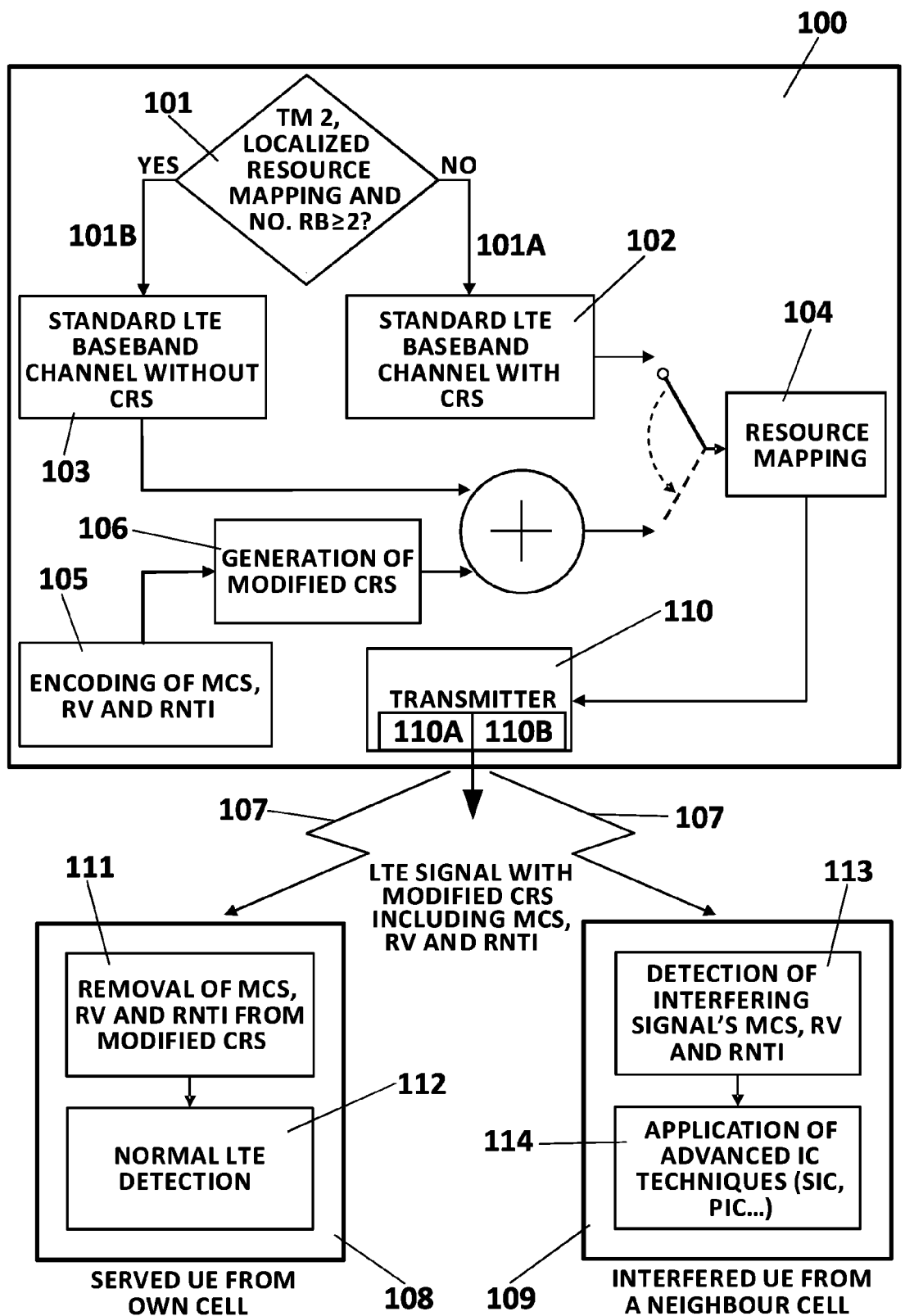
FIG. 1 shows a block diagram of a system for assisting user devices of an LTE cellular network in performing advanced interference cancellation, according to a preferred embodiment of the invention.

FIG. 1 presents a general schema of the main functional blocks for aiding mobile user devices in accordance with the proposed method in a OFDMA mobile network comprising a base station 100, which particularly is a LTE base station, called enhanced NodeB (eNodeB) having a transmitter 110 with at least two transmitting antennas, 110A, 110B. According to a preferred embodiment of the invention, the LTE base station 100 evaluates 101:
  whether a given downlink physical channel for a given user employs Transmission Mode 2 (TM2),
  whether it employs localized resource mapping, and
  whether it occupies at least two resource blocks (RBs).

If any of these three conditions are not met 101A, the physical channel is generated according to standard LTE procedures along with the cell reference signals 102, and subsequently mapped 104 to LTE resources. However if the three conditions are met 101B, the base station generates the LTE baseband signal corresponding to the downlink channel without the standard cell reference signals 103. At the same time, the modulation and coding scheme (MCS), the Radio Network Temporary Identifier (RNTI) and the Redundancy Version (RV) characterizing the transmission are all encoded 105 for increased protection, according to any suitable encoding operation. This encoded information is then included as additional coefficients of a new modified cell reference signal (CRS), which is generated 106 based upon standard CRS but also carries additional information on the MCS, RNTI and RV values characterizing each physical transmission in downlink.

After suitable resource mapping 104, the transmitter 110 generates an LTE signal to be transmitted 107 with the modified CRS structure, which can then be received by served UEs 108 camping in the own cell as well as by interfered UEs 109 camping in neighbour cells. Served UEs 108 detect the modified CRS and remove 111 such redundant information on MCS, RNTI and RV, as these parameters can normally be obtained from the Physical Downlink Control Channel (PDCCH) by standard LTE detection procedure 112. At the same time, interfered UEs 109 from a neighbour cell detect the interfering signal 113 and extract the signalled MCS, RNTI and RV values for each physical channel to take advantage of these additional information, provided that the user is not in very high mobility conditions, in order to perform advanced interference cancellation (IC) techniques 114. The network can therefore aid devices in the successful operation of advanced IC techniques that require appropriate detection and reconstruction of the observed interference from other cells.

Figure 2:
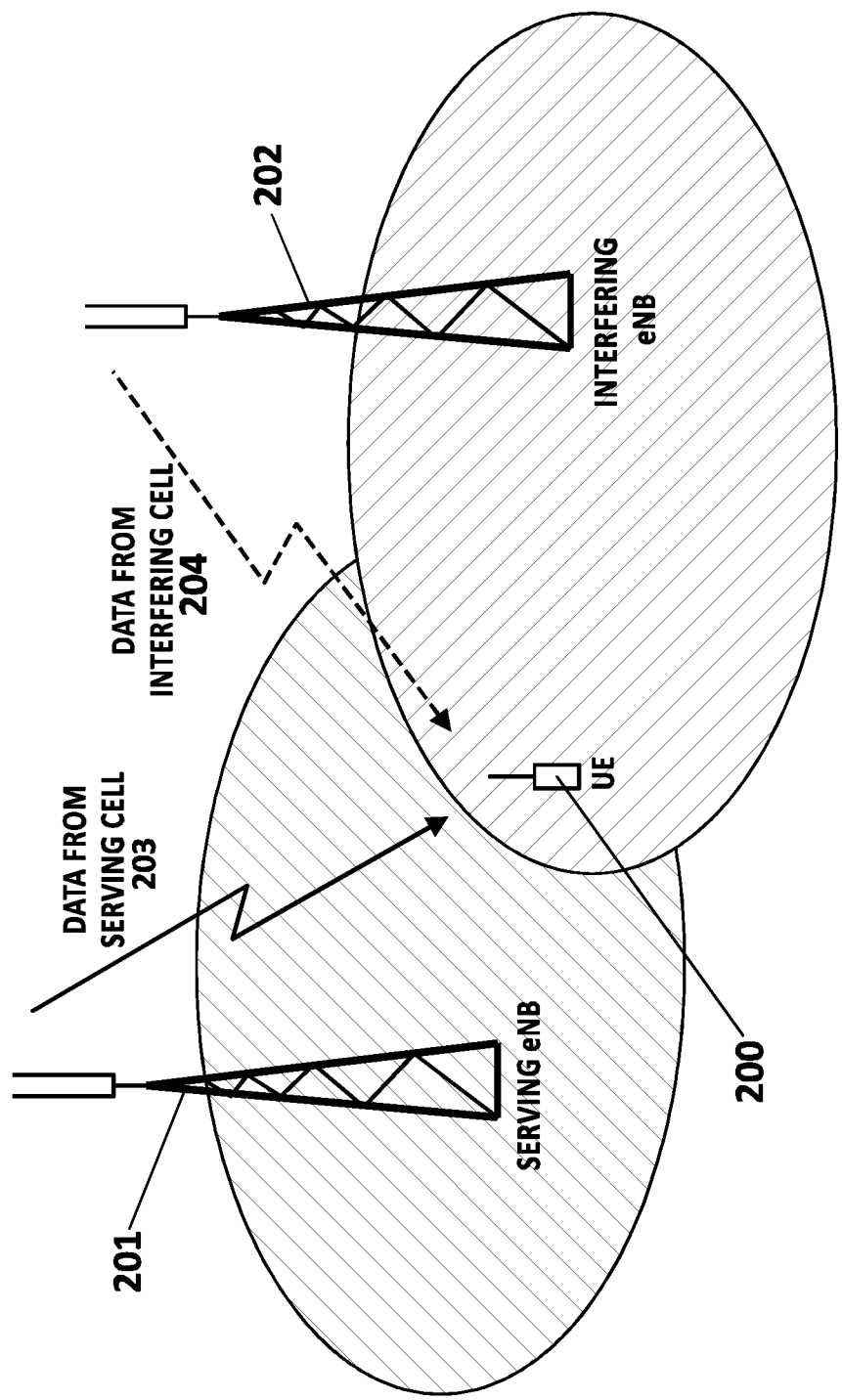
FIG. 2 shows a schematic diagram of a network scenario for a method of assisting user devices in performing advanced inter-cell interference cancellation, in accordance with a possible application case of the invention.

FIG. 2 shows a possible network scenario for the application of the proposed invention. A user device 200 or user equipment (UE) of a LTE network is connected to a serving base station 201, i.e., an eNodeB (eNB) in LTE networks, is suffering from significant interference at the cell edge, where signals from one or more interfering base stations 202, at one or more neighbour cells, collide with those from the serving base station 201 in both time and frequency dimensions. The user device 200, receiving data from its serving cell 203 and data from one or more interfering cells 204, would suffer from significant performance degradation, unless either some centralized scheduling technique is applied, which is not the usual case in standard LTE network deployments, or advanced IC techniques are applied at the user device 200.

In what follows it is assumed that each base station, 201, 202, has a minimum of two transmitting antennas. This invention proposes changes in the Cell Reference Signals transmitted by LTE base stations, 201, 202, along the resource blocks reserved for a particular physical signal, for detection of the MCS, RNTI and RV values by interfered user devices 200 in neighbour cells, in case that the following three conditions are met for a given downlink physical channel:
  transmission mode 2 (TM2, also called transmit diversity) is the multi-antenna transmission scheme employed for the physical channel;
  localized resource mapping is used for mapping of data to physical RBs; and
  at least two resource blocks (RBs) are occupied.

If these conditions are met, the following changes are proposed for the CRS signals included within the RBs reserved for that channel:
  1. The CRS signals mapped into a first antenna, antenna port 0, are changed in the second slot of each subframe with the purpose of carrying an encoded indication of both the MCS format in use and the RV value.
  2. The CRS signals mapped into a second antenna, antenna port 1, are changed in the second slot of each subframe with the purpose of carrying an encoded indication of the associated RNTI value.

The three conditions previously stated are easily met by the majority of physical channels in regular macro cell environments, including control information like paging and System Information Blocks, where transmit diversity is used for enhanced detection. Localized resource mapping is the preferred option in most scenarios for dynamic channel-dependent scheduling, unless the physical transmissions encompass a small number of RBs and the benefits of localized scheduling are limited. In this latter case distributed mapping is the best option for increased frequency diversity, as e.g. in VoIP traffic. However, the benefits of interference cancellation become less effective when the interfering signal occupies a small number of RBs, and the penalty for not using IC in this case would be small. Finally a minimum of two occupied RBs is usually encountered except for very low-bandwidth applications where IC techniques are less effective.

If any of the previous three conditions are not met, the cell reference signals remain unchanged with respect to standard LTE operation and interfered user devices 200 have to either perform blind detection for interference cancellation or not perform IC at all. The base station 100, 201, 202 can thus incorporate the proposed additional signaling only for the cases where it would be most effective, actually representing the majority of downlink traffic in practical situations.

The CRS signals mapped within the first slot of each subframe remain unchanged with respect to standard LTE operation. The reason for this is twofold:

- As the first slot contains the Physical Dedicated Control Channel (PDCCH), Physical Control Format Indicator Channel (PCFICH) and Physical HARQ Indicator Channel (PHICH), it is important not to change the definition of the CRS for proper detection of such control information, which contains among others the MCS, RNTI and RV values corresponding to each user.
- By comparing the CRS signals of both the first and second slots, it is possible to obtain the actual phase changes that ultimately convey the encoded information corresponding to the MCS, RNTI and RV parameters.

Figure 3:
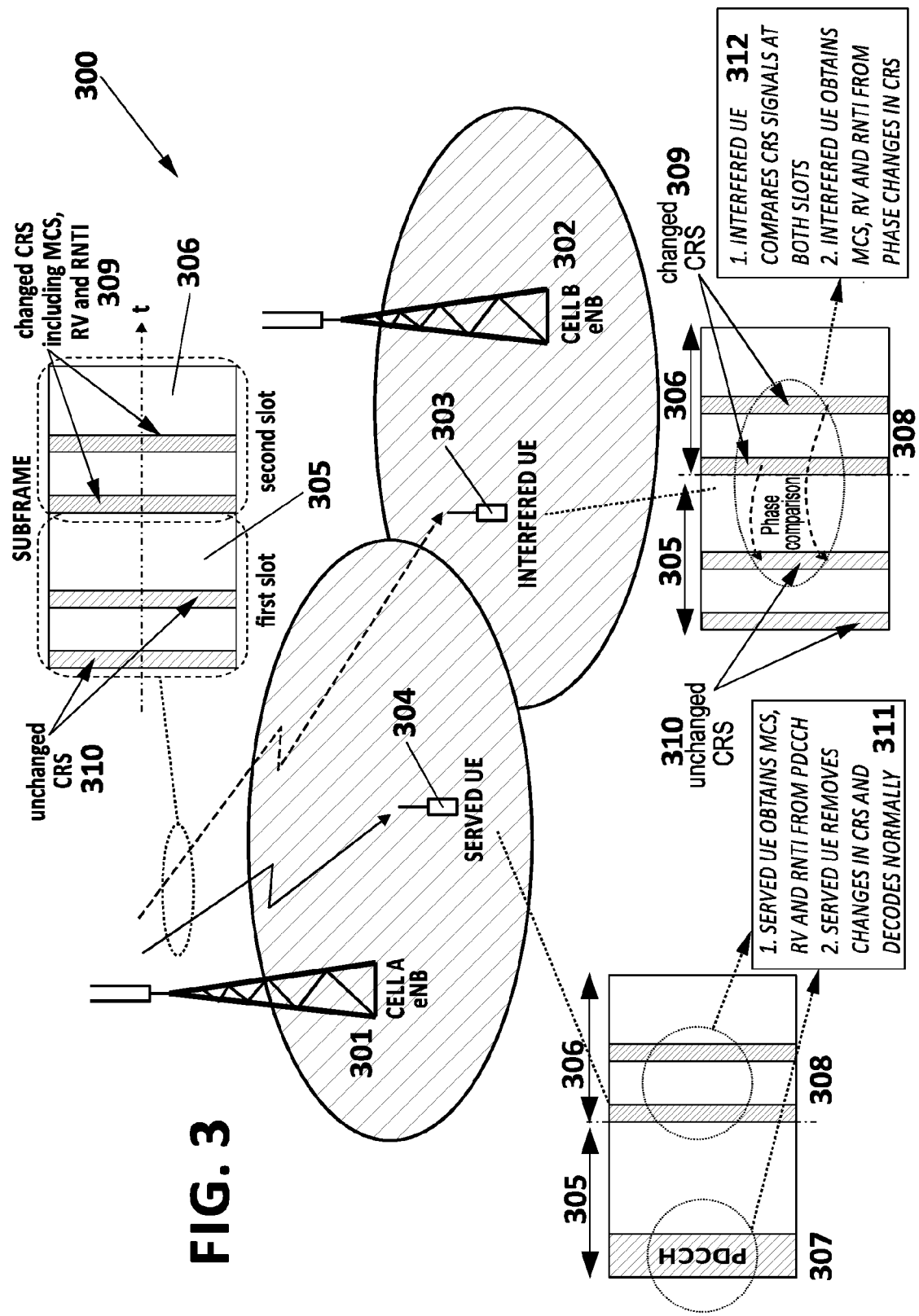
FIG. 3 shows a schematic diagram of a network scenario for a method of assisting user devices in performing advanced inter-cell interference cancellation focussing on the steps carried out by user devices, in accordance with a possible application case of the invention.

FIG. 3 illustrates a basic procedure to be followed by user devices of a cellular network according to a possible embodiment of the proposed invention. In the cellular network (e.g. a LTE network), it is distinguished a serving cell 301, denoted as cell "A", and an interfering cell which is a neighbour cell 302, denoted as cell "B", covered by respective base stations (in this example, eNodeBs), eNB in cell "A" and eNB in cell "B". A given cell "A" 301, serving user devices 304, creates significant interference to other users camping in an adjacent cell "B" 302, and these interfered user devices 303 require additional signaling for appropriate operation of advanced IC techniques, namely the interfering signal's MCS, RNTI and RV values. To that purpose, only the cell reference signals mapped on the second slot 306 in each subframe 300 are changed along the resource blocks reserved for a particular channel and user, leaving those at the first slot 305 unchanged. Provided that interfered user devices 303 in cell "B" 302 are not in very high mobility conditions, they are able to compare the phases of the cell reference signals in both slots and then obtain the encoded values 308 of MCS, RNTI and RV. After channel decoding of these parameters, interfered user devices 303 can perform any advanced IC technique that requires proper reconstruction of the interfering signals. Therefore, the steps followed by the interfered user devices 303 are 312: comparing the unchanged CRS 310 with the changed CRS 309, at the first slot 305 and second slot 306 respectively, and obtaining the encoded values 308 of MCS, RV and RNTI from detected phase changes in the subframe 300.

At the same time, served user devices 304 camping in cell "A" 301 normally decode the PDCCH channel 307 with the aid of the unchanged cell reference signals in the first slot 305. The PDCCH contains, among other control information, the MCS, RNTI and RV values of interest, and hence served user devices 304 are able to compensate the effect of the changes introduced in the cell reference signals of the second slot 306 for normal detection. Therefore, the steps followed by the served user devices 304 are 311: obtaining the MCS, RNTI and RV values of interest from the PDCCH channel 307 included in the first slot 305 and removing the encoded values 308 of MCS, RNTI and RV included in the second slot to decode the subframe 300 normally.

In case that the base station in cell "A" 301 does not apply the proposed changes in the cell reference signals, due to not meeting the three requirements given above, served user devices 304 camping in cell "A" 301 detect this condition by normally obtaining the values of said transmission mode, resource mapping and number of resource blocks from the PDCCH. In that case served user devices 304 detect that normal operation should take place and do not have to compensate for the phase changes in the cell reference signals.

At the same time, interfered user devices 303 in cell "B" 302 either detect encoded values 308 of MCS, RV and RNTI consisting on a repeated pattern of "+1" values which does not represent any physical value, thus indicating that no extra signalling is actually given, or detect random variations in the phases of the cell reference signals as caused by a high speed of said interfered user devices. In both cases, interfered user devices 303 in cell "B" 302 detect that normal operation should take place.

The proposed basic procedure of FIG. 3 can easily be extended to a network scenario with interference cancellation of multiple cells by an interfered UE, just by decoding multiple MCS, RNTI and RV indications from a number of interfering cells.

The changes required for the inclusion of MCS, RNTI and RV parameters in the cell reference signals are explained in what follows.

CRS signals in LTE standard are defined by the following sequences, as specified in 3GPP TS 36.211 v10.4.0 "Evolved Universal Terrestrial Radio Access (E-UTRA); Physical Channels and Modulation (Release 10)":

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame, l is the OFDM symbol number within the slot, $N_{RB}^{max,DL}$ is the maximum number of RBs in downlink, and c(i) is a pseudo-random sequence comprised of a length-31 Gold sequence with an initialization value. These signals extend over the whole system bandwidth for channel estimation. The pseudo-random sequence is initialized at the start of each OFDM symbol with the expression:

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$

where $N_{ID}^{cell}$ is the physical cell identifier and $N_{CP}$ takes the values 1 or 0 depending on whether normal cyclic prefix or extended cyclic prefix is used, respectively.

This invention proposes to change the CRS signals included within the Resource Blocks (RBs) reserved for a particular channel and user, provided that TM2 and localized resource mapping are used and at least two resource blocks are scheduled, by the following expressions:

$$r_{l,n_s}^{TX0}(m) = a_{l,n_s}(2m) \cdot \frac{1}{\sqrt{2}}(1 - 2 \cdot c(2m)) +$$

$$ja_{l,n_s}(2m+1) \cdot \frac{1}{\sqrt{2}}(1 - 2 \cdot c(2m+1))$$

$$r_{l,n_s}^{TX1}(m) = b_{l,n_s}(2m) \cdot \frac{1}{\sqrt{2}}(1 - 2 \cdot c(2m)) +$$

$$jb_{l,n_s}(2m+1) \cdot \frac{1}{\sqrt{2}}(1 - 2 \cdot c(2m+1))$$

In the above expression $a_{l,n_s}$, $b_{l,n_s}$ are coefficients that take values +1 or −1 depending on the encoded values of MCS, RNTI and RV, $r_{l,n_s}^{TX0}$ denotes the reference signals to be mapped on the first antenna of the base station, i.e., antenna port 0, and $r_{l,n_s}^{TX1}$ denotes the reference signals to be mapped on its second antenna, i.e., antenna port 1.

The MCS value can be represented by a 5-bit digital word indicating one out of 32 possible MCS formats. The RV parameter can also be represented by a two-bit digital word. The concatenation of MCS and RV therefore has a length of 7 bits and can be encoded for increased reliability, resulting in $N_{MCSRV}$ encoded bits as represented by the expression $(M_0, M_1, \ldots, M_{N_{MCSRV}-1})$. It will be assumed that the length $N_{MCSRV}$ can be padded to an integer multiple of 4 bits for ease of mapping on resource elements.

Similarly the RNTI value can be represented by a 16-bit digital word, which can be encoded for increased reliability thus resulting in $N_{RNTI}$ encoded bits as represented by the expression $(R_0, R_1, \ldots, R_{N_{RNTI}-1})$. It will also be assumed that the length $N_{RNTI}$ can be padded to an integer multiple of 4 bits.

These encoded bits are converted to bipolar values "+1" and "−1" prior to mapping on cell reference signals. Value "+1" can correspond to an encoded binary digit "0" and value "−1" to an encoded binary digit "1", but the converse rule can also be applicable according to particular implementation needs.

The above introduced first coefficients $a_{l,n_s}$ depend on the encoded MCS and RV according to the following equations:

$$a_{l,n_s}(4k) = \begin{cases} +1, & n_s \text{ even} \\ M_{4k \bmod N_{MCSRV}}, & n_s \text{ odd and } l = 0 \end{cases}$$

$$a_{l,n_s}(4k+1) = \begin{cases} +1, & n_s \text{ even} \\ M_{(4k+1) \bmod N_{MCSRV}}, & n_s \text{ odd and } l = 0 \end{cases}$$

$$a_{l,n_s}(4k+2) = \begin{cases} +1, & n_s \text{ even} \\ M_{(4k+2) \bmod N_{MCSRV}}, & n_s \text{ odd and } l = 4 \end{cases}$$

$$a_{l,n_s}(4k+3) = \begin{cases} +1, & n_s \text{ even} \\ M_{(4k+3) \bmod N_{MCSRV}}, & n_s \text{ odd and } l = 4 \end{cases}$$

In these equations $k=0, 1, \ldots, 2 \cdot N_{RB}-1$ is an index that runs through the subcarriers devoted to reference signals in the RBs reserved for a physical channel, and the number of scheduled RBs is denoted by $N_{RB}$. It is apparent that each resource element containing a cell reference signal will convey two encoded bits. As four resource elements are devoted to cell reference signals per each RB in the second slot of each subframe, a total of 8 encoded bits can be included per RB.

The modulus operation in the above equations implies a repetition of the encoded bits up to the number of reserved resource blocks, therefore increasing protection.

The corresponding equations for the second coefficients $b_{l,n_s}$ are as follows:

$$b_{l,n_s}(4k) = \begin{cases} +1, & n_s \text{ even} \\ R_{4k \bmod N_{RNTI}}, & n_s \text{ odd and } l = 0 \end{cases}$$

$$b_{l,n_s}(4k+1) = \begin{cases} +1, & n_s \text{ even} \\ R_{(4k+1) \bmod N_{RNTI}}, & n_s \text{ odd and } l = 0 \end{cases}$$

$$b_{l,n_s}(4k+2) = \begin{cases} +1, & n_s \text{ even} \\ R_{(4k+2) \bmod N_{RNTI}}, & n_s \text{ odd and } l = 4 \end{cases}$$

$$b_{l,n_s}(4k+3) = \begin{cases} +1, & n_s \text{ even} \\ R_{(4k+3) \bmod N_{RNTI}}, & n_s \text{ odd and } l = 4 \end{cases}$$

Figure 4:
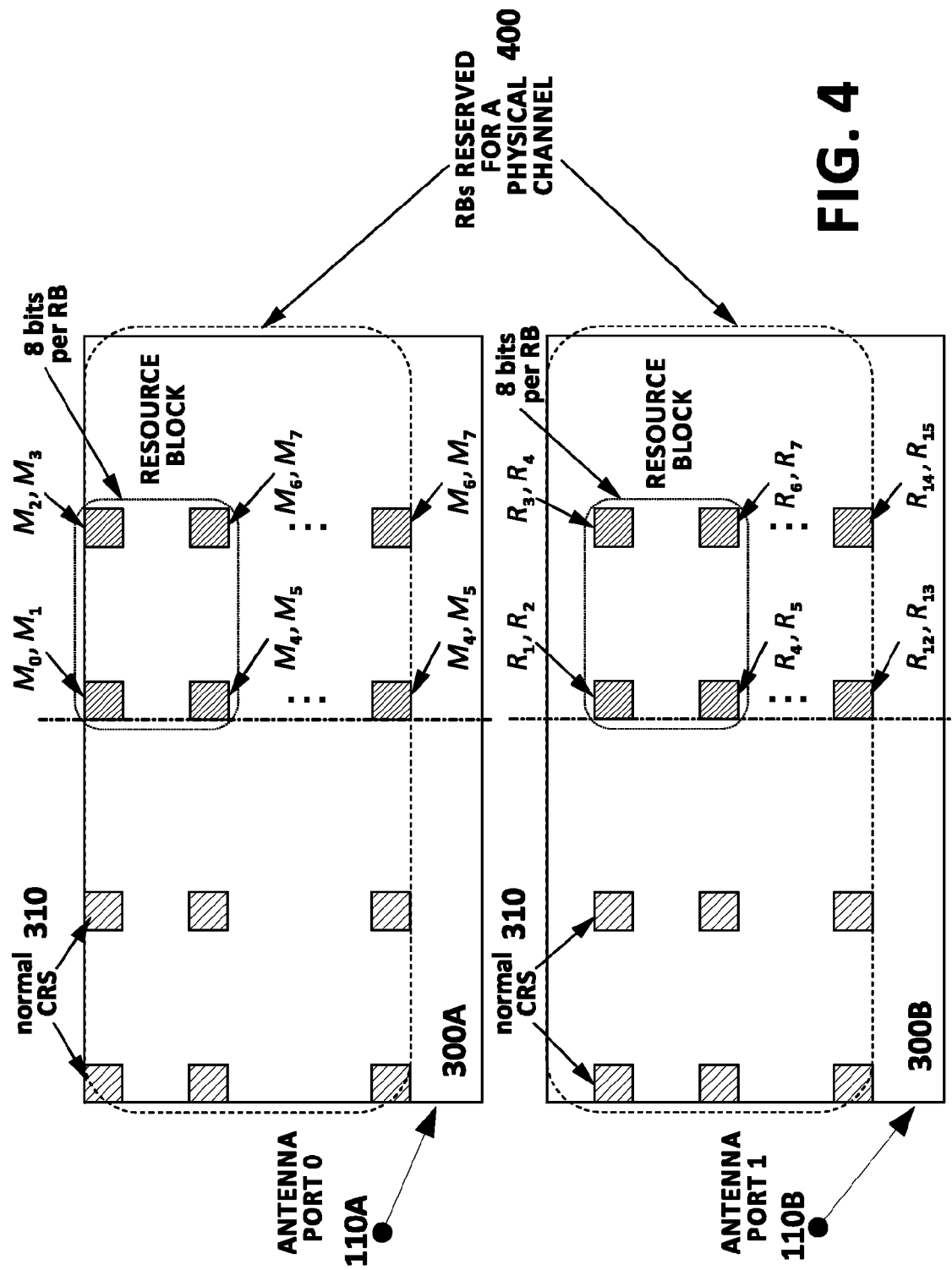
FIG. 4 shows a schematic diagram of a mapping operation between cell reference signals, with and without modifications, and resource blocks, in accordance with a possible embodiment of the invention.

FIG. 4 illustrates the proposed mapping of cell reference signals on the resource blocks 400 which are reserved for a given physical channel, in the particular case of $N_{MCSRV}=8$ and $N_{RNTI}=16$. Only the second slot 306 in each subframe, 300A, 300B, respectively transmitted via the first antenna, 110A or antenna port 0, and the second antenna, 110B or antenna port 1, contains the relevant indications for MCS, RV and RNTI, leaving the cell reference signals from the first slot 305 unchanged. With reference to FIG. 3, served user devices 304 camping in cell "A" 301 are able to normally decode the PDCCH with the aid of the unchanged cell reference signals in the first slot 305, thus obtaining the relevant control information including the MCS, RV and the RNTI. With this information they are able to compensate for the $a_{l,n_s}$, $b_{l,n_s}$ coefficients intentionally included as part of the cell reference signals in the second slot 306 prior to estimating the channel frequency response.

At the same time, with reference to FIG. 3, interfered user devices 303, camping in neighbour cell "B" 302 and suffering from significant interference from cell "A" 301, are able to compare the phases of the cell reference signals in the first slot 305 and second slot 306. Specifically, interfered user devices 303 can compare the phases of the cell reference signals in the second slot 306, slot 1, with those of symbol 4 in the first slot 305, i.e., slot 0. Assuming that the channel frequency response does not significantly change over a time interval of half a slot (0.5 ms), it will be easy for them to obtain the coefficients $a_{l,n_s}$, $b_{l,n_s}$ that contain the MCS, RV and RNTI from the observed phase changes. Repetition of the encoded bits up to the number of available resource blocks allows for increased protection especially when the number $N_{RB}$ of Resource Blocks reserved for a given physical channel is high, where it is most important for IC schemes to be effective.

Figure 5:
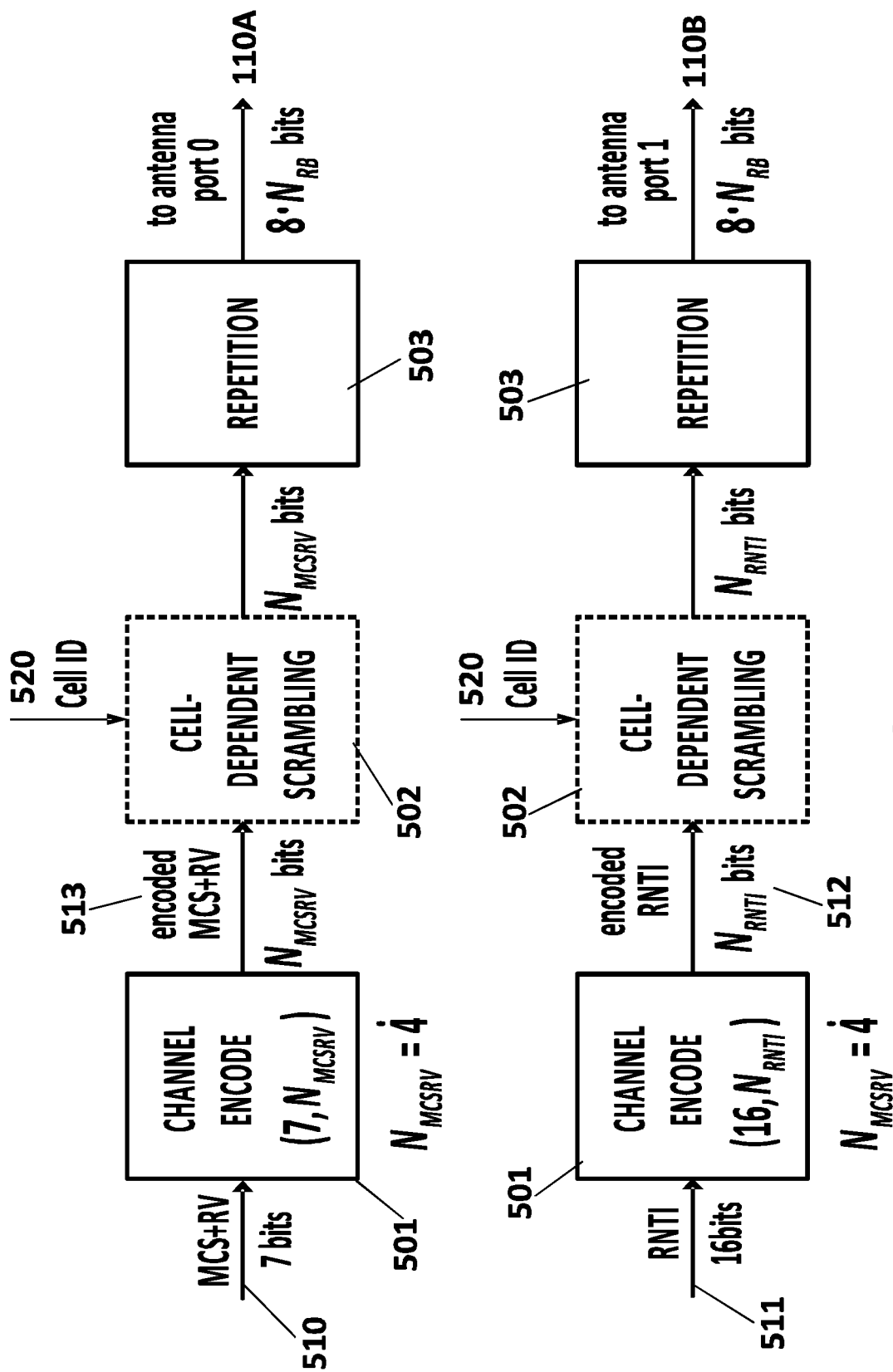
FIG. 5 shows a a block diagram of a channel encoding operation for introducing modified values of MCS, RV and RNTI parameters characterizing a physical channel, in accordance with a possible embodiment of the invention, taking LTE as a reference for the parameter lengths.

FIG. 5 illustrates the proposed channel encoding operation for MCS, RV and RNTI prior to inclusion as part of the modified cell reference signals, taking LTE as a reference for the parameter lengths. Firstly the MCS, RV and RNTI values are encoded 501 for additional protection. The MCS and RV values are concatenated prior to the first encoding operation. It is proposed to apply any encoding operation that transforms both the concatenated (MCS+RV) binary value 510 and the RNTI value 511 into suitable encoded words, with a length that is a multiple of 4 bits for ease of mapping to resource elements. As the RNTI encoded value 512 has a minimum length of 16 bits (corresponding to the uncoded case), and the encoded concatenation of MCS and RV 513 has a minimum length of 7 bits, at least two resource blocks are required for mapping the encoded values into the cell reference signals. Any block code that transforms the uncoded words into suitable coded words with a length that is a multiple of 4 bits can be used for the purposes of the present invention. Additionally it should not result into encoded words consisting on "all +1" values, as this would be reserved for the case of no applying any changes in the cell reference signals. Optionally, a scrambling operation 502 can be applied after the coding operation in order to avoid having similar values for the constituent coefficients of the cell reference signals in multiple cells. However this scrambling operation, using a cell identifier 520, is not considered essential as standard cell reference signals do provide some randomization of inter-cell interference. Finally, repetition 503 of the resulting MCS, RV and RNTI encoded words can be applied over the number of resource blocks actually reserved for transmission. A total of bits $8 \cdot N_{RB}$ are available within the $N_{RB}$ resource blocks reserved for transmission via antenna port 0 corresponding to the first antenna, 110A, and via antenna port 1 corresponding to the second antenna 110B of the base station 100. It is apparent that the higher the number of resource blocks, the higher the protection of the resulting encoded values. This is beneficial for IC schemes as interference from wider bandwidth signals is in general much more harmful than from narrowband signals. The boundaries between the RNTI indications determine the bandwidth reserved for each user, which is also essential for application of IC techniques. These boundaries can be easily obtained by observing the repetition pattern of RNTI after detecting the modified cell reference signals.

Figure 6:
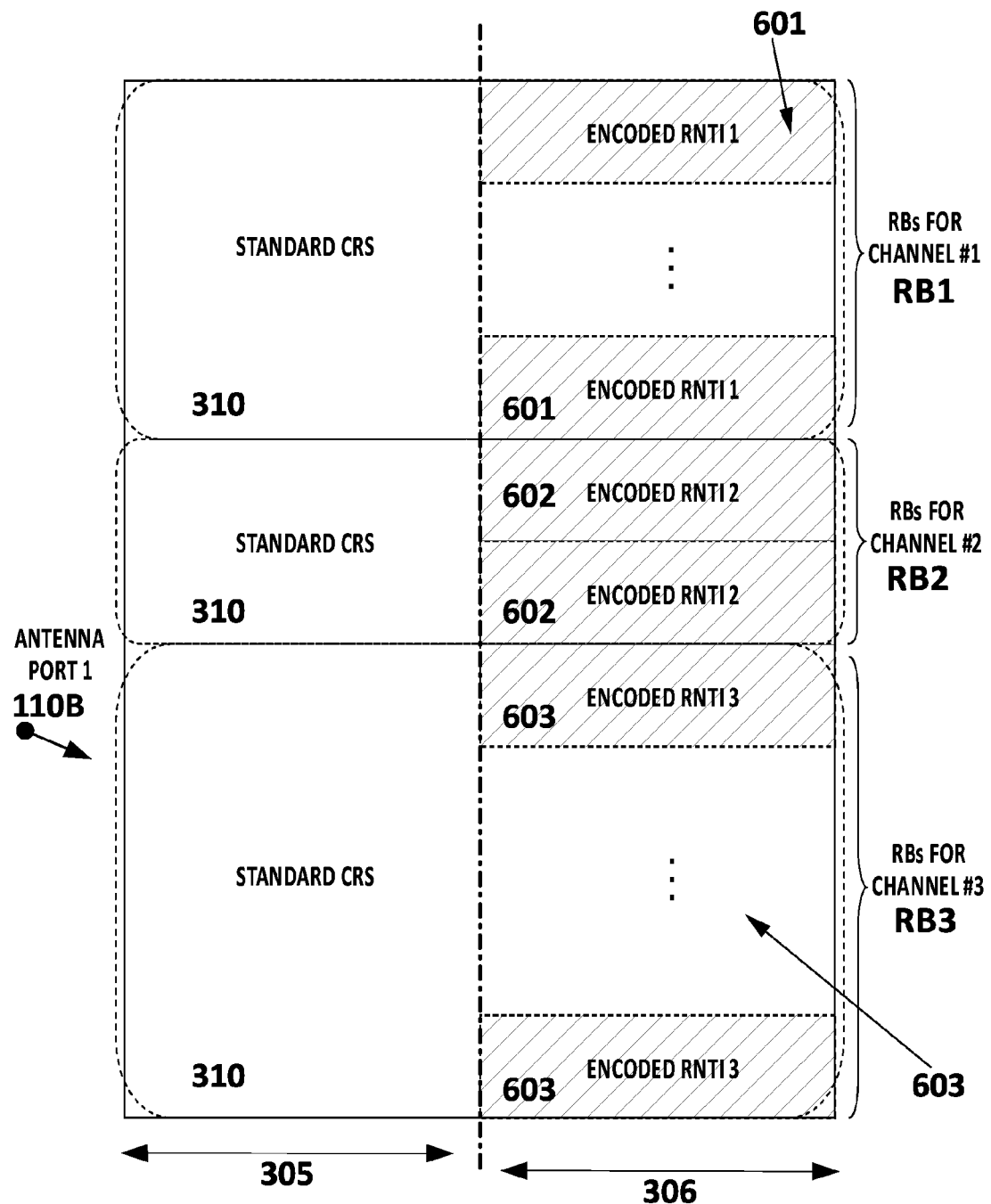
FIG. 6 shows a schematic diagram of encoded RNTI patterns that help determine the number of resource blocks occupied by each interfering signal, according to a possible embodiment of the invention.

FIG. 6 illustrates an example of encoded RNTI patterns 601, 602, 603 that help determine the number of resource blocks for each channel occupied by each interfering signal. FIG. 6 shows resource blocks for a first channel, RB1, resource blocks for a second channel, RB2, and resource blocks for a third channel, RB3, with boundaries between channels defined by detecting the repetition of different RNTI patterns 601, 602, 603.

Figure 7:
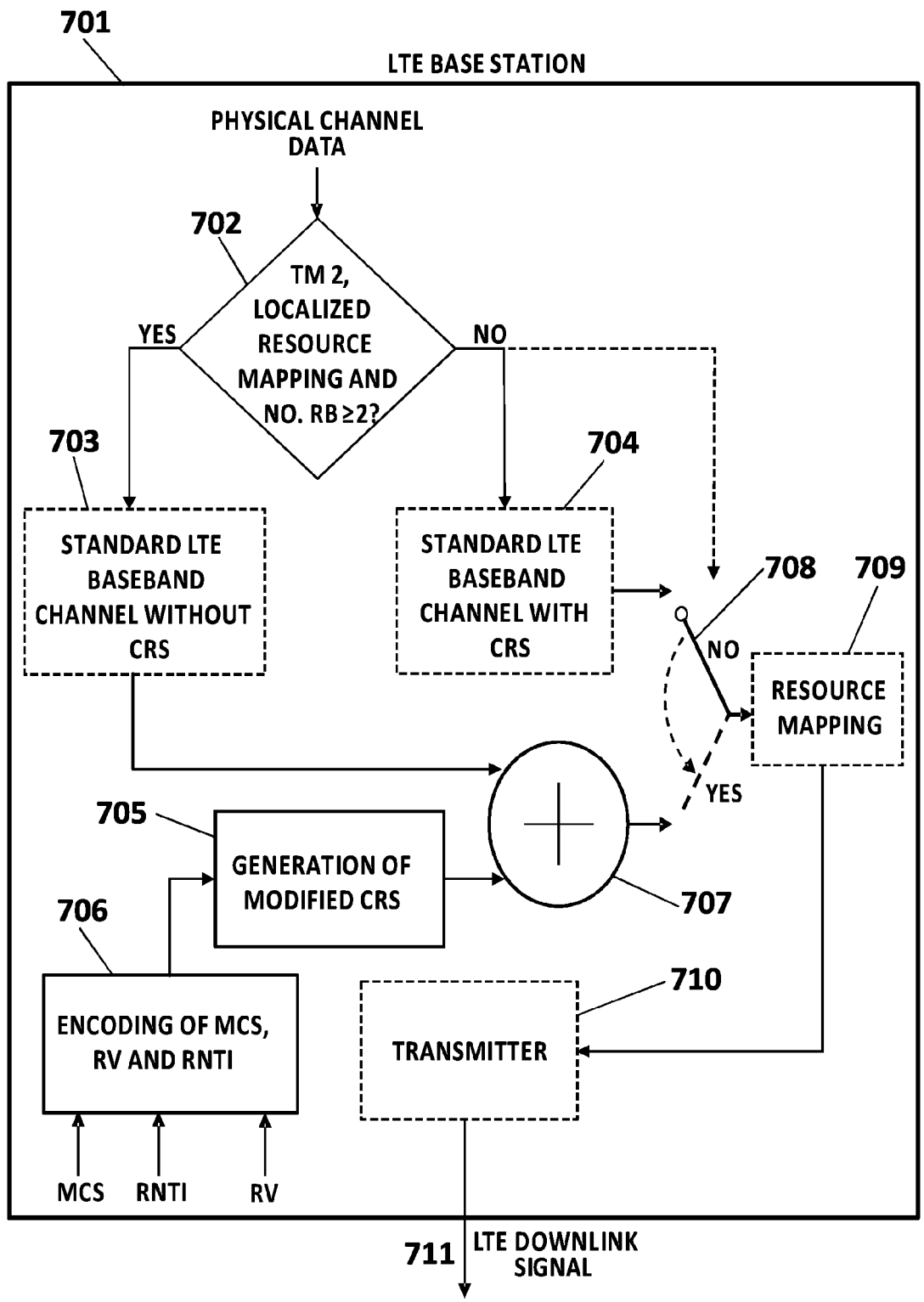
FIG. 7 shows a block diagram of steps carried out by a base station for assisting user devices of a LTE network in performing advanced interference cancellation, according to a possible embodiment of the invention.

FIG. 7 depicts an exemplary embodiment for the proposed invention to be implemented in an LTE eNodeB with at least two transmit antennas, where the proposed blocks are in solid lines while prior art elements relevant for the proposed embodiment are depicted in dashed lines. Block 701 depicts schematically an LTE eNodeB where a number of physical channels are to be mapped on the downlink signal in a given subframe. Block 702 evaluates whether the conditions for application of the proposed invention are met, namely the use of transmission mode 2 (TM2), localized resource mapping and a minimum of two resource blocks. If these conditions are not met, an LTE baseband channel with standard cell reference signals is generated by block 704, and the switch represented by block 708 will be in the "NO" position prior to the resource mapping (block 709). If the conditions are met, block 703 first generates the baseband signal for the corresponding channel but excluding the cell reference signals. Block 706 transforms the MCS, RV and RNTI digital values into appropriate encoded words to be included within the cell reference signals, and block 705 generates the modified cell reference signals. Block 707 combines the baseband channel data and the modified cell reference signals, and the switch 708 in the "YES" position selects the modified baseband signal prior to the mapping operation. Block 709 performs standard resource mapping on LTE resources and block 710 transmits the downlink LTE signals 711 as known in LTE systems.

Figure 8:
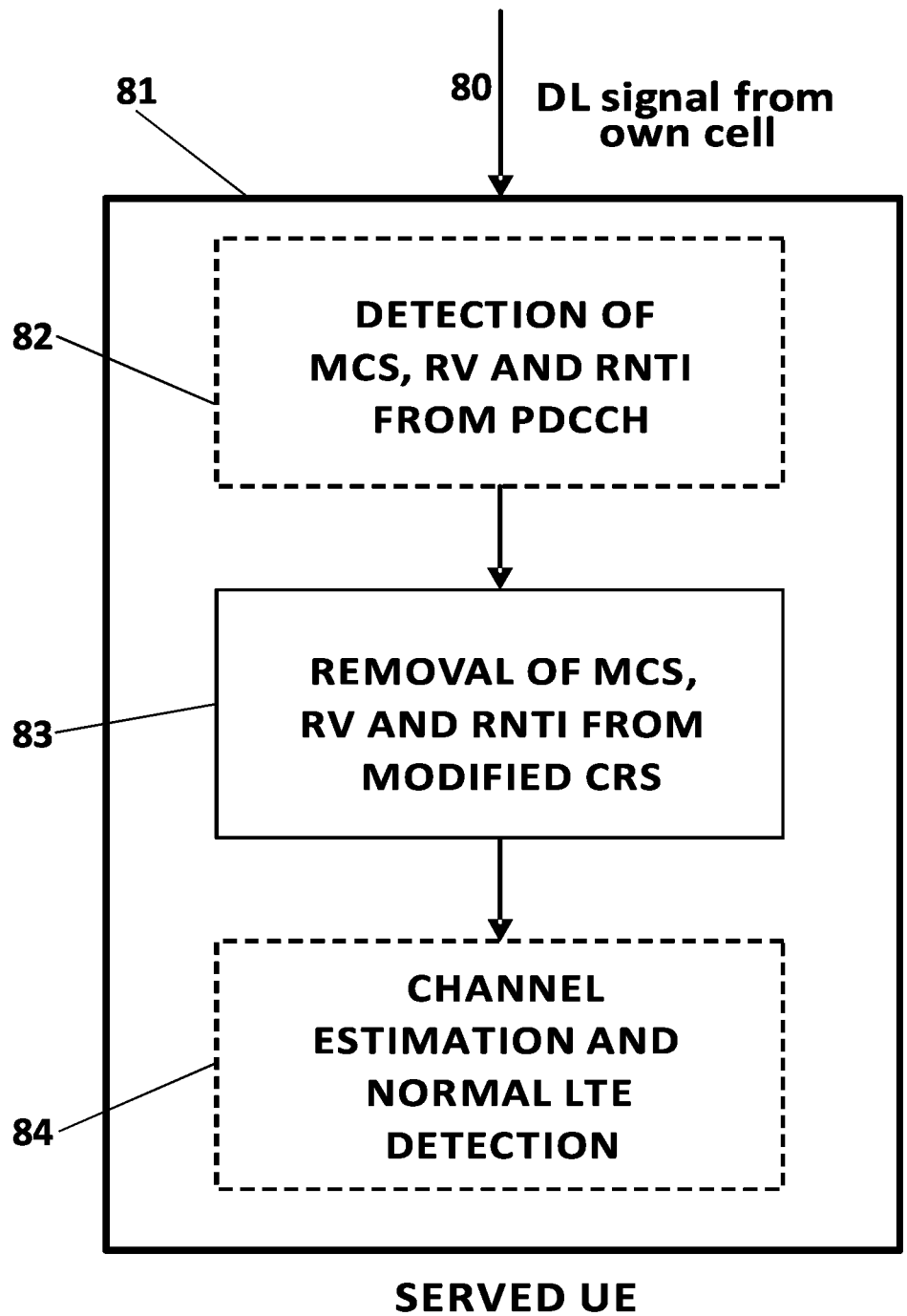
FIG. 8 shows a block diagram of steps carried out by a served LTE user device assisted in performing advanced interference cancellation, according to a possible embodiment of the invention.

FIG. 8 illustrates an exemplary embodiment for the proposed invention in a served UE 81 camping in the own cell. The served UE 81 detects an LTE downlink signal 80 from its own cell according to the changes proposed in this invention. The MCS, RV and RNTI parameters are obtained from dedicated control signaling carried by the PDCCH by a downlink channel detector 82. An eliminator block 83 removes the corresponding encoded indications from the received cell reference signals prior to channel estimation, whenever the conditions for application of the encoded indications are met as indicated by dedicated control signaling carried by the PDCCH. Finally a channel estimator and LTE detector 84 performs channel estimation by means of Wiener filtering, least squares interpolation, or any other suitable technique, followed by a channel equalization technique such as Zero-Forcing, MMSE or Maximum Likelihood, among others. Again the block proposed in the present invention, the eliminator block 83, is depicted in solid lines, while prior art blocks are represented in dashed lines.

Figure 9:
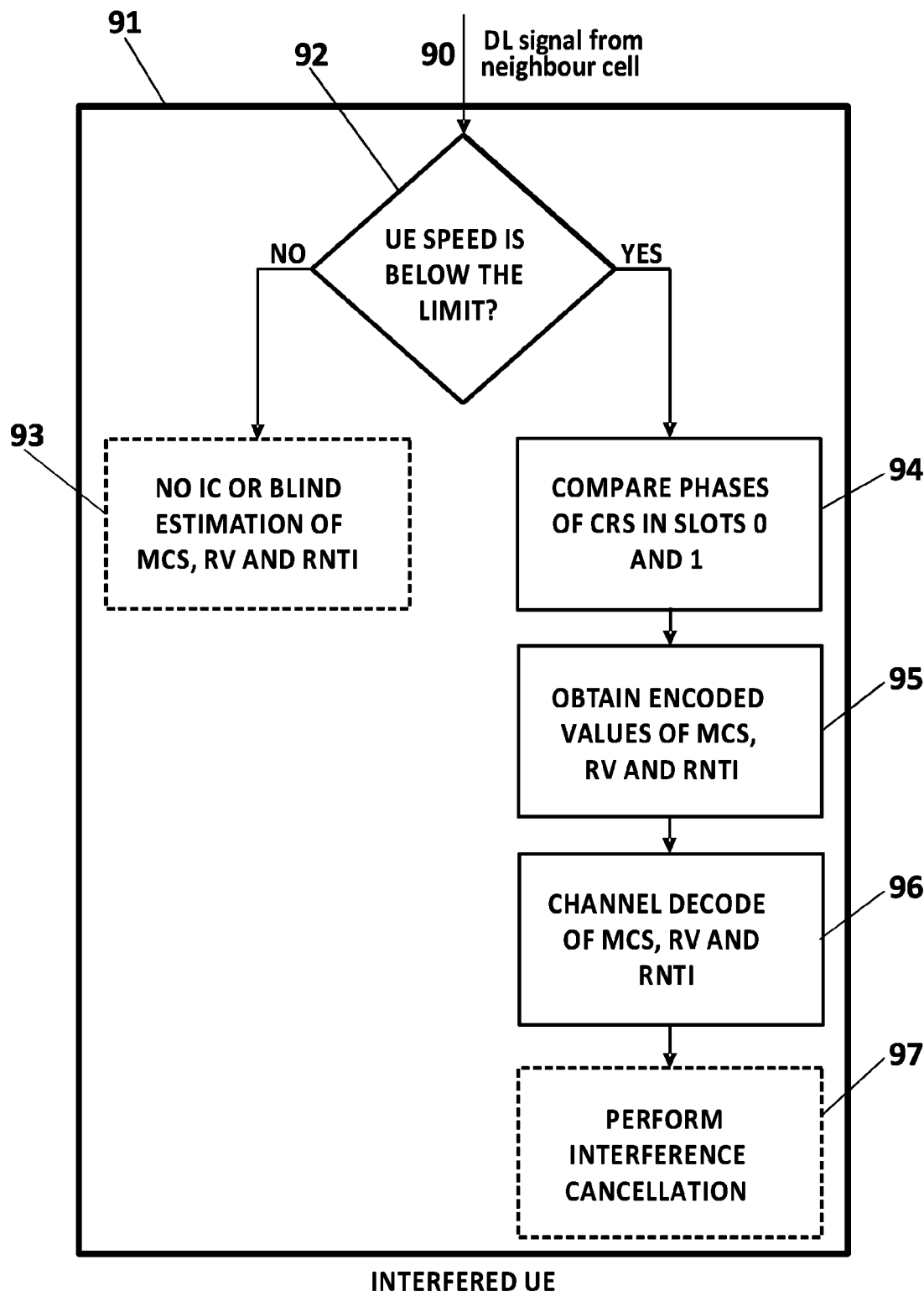
FIG. 9 shows a block diagram of steps carried out by an interferred LTE user device assisted in performing advanced interference cancellation, according to a possible embodiment of the invention.

FIG. 9 illustrates yet another embodiment for application of the proposed invention in an interfered user device 91 camping in a neighbour cell. The interfered UE 91 detects significant interference from a neighbour cell's downlink signal 90, and a speed evaluator 92 evaluates the speed of the interfered UE 91 by using any suitable means. If it is above the speed limit corresponding to the carrier frequency, the interfered UE 91 does not rely on the interfering CRS for interference cancellation, and instead it applies a channel parameters estimator block 93 using some blind detection of MCS, RV and RNTI parameters or performing no interference cancellation at all. If the UE speed is below the limit, the interfered UE 91 uses a phase comparator 94 to compare the relative phases of the detected cell reference signals in slots 0 and 1, and therefore obtain in block 95 the encoded indications of MCS, RV and RNTI. After proper channel decoding by decoder 96, the receiver can trigger any suitable interference cancellation block 97 applying an IC technique that requires proper reconstruction of the interfering signal.

The proposed embodiments can be implemented as a collection of software elements, hardware elements, firmware elements, or any suitable combination of them.

Note that in this text, the term "comprises" and its derivations (such as "comprising", etc.) should not be understood in an excluding sense, that is, these terms should not be interpreted as excluding the possibility that what is described and defined may include further elements, steps, etc.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:
1. A method for assisting user devices in performing downlink interference cancellation in Orthogonal Frequency-Division Multiple Access (OFDMA) wireless networks, comprising:
wherein an interfered user device is suffering from interference from an interfering base station to which a served user device is connected at a serving cell, and the interfered user device being at a neighbour cell which is neighbour of the serving cell;
transmitting by the interfering base station a downlink signal in a first slot and a second slot of a radio subframe, the first slot and the second slot including cell reference signals for physical channel estimation;
modifying phases of cell reference signals included in the second slot, the phase modifications indicating encoded values of parameters which establish the physical channel according to an encoding procedure, receiving the first slot and the second slot of the radio subframe by the served user device, the served user device:
  detecting the parameters which establish the physical channel as carried by dedicated control signalling applied to the physical channel,
  encoding the detected parameters according to the encoding procedure,
  reconstructing an unchanged cell reference signal for carrying the encoded detected parameters,
  prior to physical channel estimation, removing the modified phases by comparing the modified cell reference signal received in the second slot with the reconstructed unchanged cell reference signal;
receiving the first slot and the second slot of the radio subframe by the interfered user device, the interfered user device:
  obtaining the encoded values by comparing the phases of the cell reference signals included in the second slot and in the first slot,
  for assisting in interference cancellation of the downlink signal from the interfering base station, comparing the encoded values with parameter patterns which indicate absence of modifications in the cell reference signals, and
  if the encoded values are different from the parameter patterns which indicate absence of modifications in the cell reference signals, decoding the encoded values, and performing interference cancellation, by using the decoded values, of the downlink signal from the interfering base station.

2. The method according to claim 1, wherein the parameters which establish the physical channel according to the encoding procedure are:
  modulation and coding scheme,
  redundancy version, and
  radio network temporary identifier.

3. The method according to claim 2, wherein the OFDMA wireless network is a Long-Term Evolution (LTE) wireless network.

4. The method according to claim 3, further comprising determining whether the interfered user device is assisted to perform interference cancellation or not, by checking whether all the following three conditions are met for the physical channel in downlink:
  LTE Transmission Mode 2 is used,
  localized resource mapping is used, and
  at least two resource blocks are reserved for the physical channel in downlink.

5. The method according to claim 4, wherein, when all the three conditions are met, the modified cell reference signal for the physical channel is mapped on a first antenna port TX0 of the interfering base station and mapped on a second antenna port TX1 of the interfering base station, and $r_{l,n_s}^{TX\,0}$ being the component mapped on the first antenna port TX0 and $r_{l,n_s}^{TX\,1}$ being the component mapped on antenna port TX1 are given by the following expressions:

$$r_{l,n_s}^{TX0}(m) = a_{l,n_s}(2m) \cdot \frac{1}{\sqrt{2}}(1 - 2 \cdot c(2m)) +$$

$$ja_{l,n_s}(2m+1) \cdot \frac{1}{\sqrt{2}}(1 - 2 \cdot c(2m+1))$$

$$r_{l,n_s}^{TX1}(m) = b_{l,n_s}(2m) \cdot \frac{1}{\sqrt{2}}(1 - 2 \cdot c(2m)) +$$

$$jb_{l,n_s}(2m+1) \cdot \frac{1}{\sqrt{2}}(1 - 2 \cdot c(2m+1)),$$

where
  $n_s$ is the number of slots within the radio subframe,
  l is the OFDMA symbol number within and slot,
  c(i) is a pseudo-random sequence comprised of a length-31 Gold sequence with an initialization value, and
  $a_{l,n_s}$, $b_{l,n_s}$ are coefficients according to the following expressions:

$$a_{l,n_s}(4k) = \begin{cases} +1, n_s \text{ even} \\ M_{4k\,mod\,N_{MCSRV}}, n_s \text{ odd and } l = 0 \end{cases},$$

$$a_{l,n_s}(4k+1) = \begin{cases} +1, n_s \text{ even} \\ M_{(4k+1)\,mod\,N_{MCSRV}}, n_s \text{ odd and } l = 0 \end{cases},$$

$$a_{l,n_s}(4k+2) = \begin{cases} +1, n_s \text{ even} \\ M_{(4k+2)\,mod\,N_{MCSRV}}, n_s \text{ odd and } l = 4 \end{cases},$$

$$a_{l,n_s}(4k+3) = \begin{cases} +1, n_s \text{ even} \\ M_{(4k+3)\,mod\,N_{MCSRV}}, n_s \text{ odd and } l = 4 \end{cases},$$

$$b_{l,n_s}(4k) = \begin{cases} +1, n_s \text{ even} \\ R_{4k\,mod\,N_{RNTI}}, n_s \text{ odd and } l = 0 \end{cases},$$

$$b_{l,n_s}(4k+1) = \begin{cases} +1, n_s \text{ even} \\ R_{(4k+1)\,mod\,N_{RNTI}}, n_s \text{ odd and } l = 0 \end{cases},$$

$$b_{l,n_s}(4k+2) = \begin{cases} +1, n_s \text{ even} \\ R_{(4k+2)\,mod\,N_{RNTI}}, n_s \text{ odd and } l = 4 \end{cases},$$

$$b_{l,n_s}(4k+3) = \begin{cases} +1, n_s \text{ even} \\ R_{(4k+3)\,mod\,N_{RNTI}}, n_s \text{ odd and } l = 4 \end{cases},$$

where
  k is an index k=0, 1, ..., $2 \cdot N_{RB} - 1$ which runs through the number of subcarriers of cell reference signals in the resource blocks reserved for the physical channel,
  $N_{RB}$ is the number of reserved resource blocks for the physical channel,
  $N_{MCSRV}$ is the number of bits after channel encoding by the encoding procedure of the modulation and coding scheme and the redundancy version parameters having both parameters been concatenated, and
  $N_{RNTI}$ is the number of bits after channel encoding of the radio network temporary identifier.

6. The method according to claim 1, wherein the OFDMA wireless network is a Long-Term Evolution (LTE) wireless network.

7. The method according to claim 6, further comprising determining whether the interfered user device is assisted to perform interference cancellation or not, by checking whether all the following three conditions are met for the physical channel in downlink:
  LTE Transmission Mode 2 is used,
  localized resource mapping is used, and
  at least two resource blocks are reserved for the physical channel in downlink.

8. The method according to claim 7, wherein, when all the three conditions are met, the modified cell reference signal for the physical channel is mapped on a first antenna port TX0 of the interfering base station and mapped on a second antenna port TX1 of the interfering base station, and $r_{l,n_s}^{TX\,0}$ being the component mapped on the first antenna port TX0 and $r_{l,n_s}^{TX\,1}$ being the component mapped on antenna port TX1 are given by the following expressions:

$$r_{l,n_s}^{TX0}(m) = a_{l,n_s}(2m) \cdot \frac{1}{\sqrt{2}}(1 - 2 \cdot c(2m)) +$$
$$ja_{l,n_s}(2m+1) \cdot \frac{1}{\sqrt{2}}(1 - 2 \cdot c(2m+1))$$

$$r_{l,n_s}^{TX1}(m) = b_{l,n_s}(2m) \cdot \frac{1}{\sqrt{2}}(1 - 2 \cdot c(2m)) +$$
$$jb_{l,n_s}(2m+1) \cdot \frac{1}{\sqrt{2}}(1 - 2 \cdot c(2m+1)),$$

where
  $n_s$ is the number of slots within the radio subframe,
  l is the OFDMA symbol number within and slot,
  c(i) is a pseudo-random sequence comprised of a length-31 Gold sequence with an initialization value, and
  $a_{l,n_s}$, $b_{l,n_s}$ are coefficients according to the following expressions:

$$a_{l,n_s}(4k) = \begin{cases} +1, n_s \text{ even} \\ M_{4k\,mod\,N_{MCSRV}}, n_s \text{ odd and } l = 0 \end{cases},$$

$$a_{l,n_s}(4k+1) = \begin{cases} +1, n_s \text{ even} \\ M_{(4k+1)\,mod\,N_{MCSRV}}, n_s \text{ odd and } l = 0 \end{cases},$$

$$a_{l,n_s}(4k+2) = \begin{cases} +1, n_s \text{ even} \\ M_{(4k+2)\,mod\,N_{MCSRV}}, n_s \text{ odd and } l = 4 \end{cases},$$

$$a_{l,n_s}(4k+3) = \begin{cases} +1, n_s \text{ even} \\ M_{(4k+3)\,mod\,N_{MCSRV}}, n_s \text{ odd and } l = 4 \end{cases},$$

$$b_{l,n_s}(4k) = \begin{cases} +1, n_s \text{ even} \\ R_{4k\,mod\,N_{RNTI}}, n_s \text{ odd and } l = 0 \end{cases},$$

$$b_{l,n_s}(4k+1) = \begin{cases} +1, n_s \text{ even} \\ R_{(4k+1)\,mod\,N_{RNTI}}, n_s \text{ odd and } l = 0 \end{cases},$$

$$b_{l,n_s}(4k+2) = \begin{cases} +1, n_s \text{ even} \\ R_{(4k+2)\,mod\,N_{RNTI}}, n_s \text{ odd and } l = 4 \end{cases},$$

$$b_{l,n_s}(4k+3) = \begin{cases} +1, n_s \text{ even} \\ R_{(4k+3)\,mod\,N_{RNTI}}, n_s \text{ odd and } l = 4 \end{cases},$$

where
  k is an index k=0, 1, . . . , $2 \cdot N_{RB}-1$ which runs through the number of subcarriers of cell reference signals in the resource blocks reserved for the physical channel,
  $N_{RB}$ is the number of reserved resource blocks for the physical channel,
  $N_{MCSRV}$ is the number of bits after channel encoding by the encoding procedure of the modulation and coding scheme and the redundancy version parameters having both parameters been concatenated, and
  $N_{RNTI}$ is the number of bits after channel encoding of the radio network temporary identifier.

9. A system for assisting user devices in performing downlink interference cancellation in Orthogonal Frequency-Division Multiple Access (OFDMA) wireless networks, comprising:
  a served user device at a serving cell;
  an interfering base station to which the served user device is connected;
  an interfered user device at a neighbour cell which is neighbour of the serving cell and the interfered user device suffering from interference from the interfering base station;
  the interfering base station comprises:
  a transmitter for transmitting a downlink signal in a first slot and a second slot of a radio subframe, the first slot and the second slot including cell reference signals for physical channel estimation, and
  a generator block for generating a modified cell reference signal in the second slot which includes phase modifications indicating encoded values of parameters which establish the physical channel according to an encoding procedure;
  the served user device comprises:
  a receiver for receiving the first slot and the second slot of the radio subframe and further comprises:
    a downlink channel detector for detecting the parameters which establish the physical channel as carried by dedicated control signalling applied to the physical channel, encoding the detected parameters according to the encoding procedure and reconstructing an unchanged cell reference signal for carrying the encoded detected parameters;
    an eliminator block for removing the phase modifications by comparing the modified cell reference signal received in the second slot with the reconstructed unchanged cell reference signal; and
    a channel estimator operating after the eliminator block;
  the interfered user device comprises:
  a receiver for receiving the first slot and the second slot of the radio subframe and further comprises:
    a phase comparator for comparing the phases of the cell reference signals included in the second slot and in the first slot;
    a block for obtaining the encoded values from the phase comparator;
    a decoder for decoding the encoded values when the encoded values are different from the parameter patterns indicating absence of modifications in the cell reference signals, and for inputting the decoded values into an interference cancellation block; and
    the interference cancellation block for applying interference cancellation of the downlink signal from the interfering base station based on a comparison of the decoded values with parameter patterns indicating absence of modifications in the cell reference signals.

10. The system according to claim 9, wherein the served user device and the interfered user device are both Long-Term Evolution (LTE) user terminals.

11. A non-transitory computer-readable medium storing program code that, when executed by a processor of a network entity in an Orthogonal Frequency-Division Multiple Access (OFDMA) network, cause the processor to execute the following steps:
  wherein an interfered user device is suffering from interference from an interfering base station to which a served user device is connected at a serving cell, and the interfered user device being at a neighbour cell which is neighbour of the serving cell;
  transmitting by the interfering base station a downlink signal in a first slot and a second slot of a radio subframe, the first slot and the second slot including cell reference signals for physical channel estimation;

modifying phases of the cell reference signals included in the second slot, the phase modifications indicating encoded values of parameters which establish the physical channel according to an encoding procedure, receiving the first slot and the second slot of the radio subframe by the served user device, the served user device:

detecting the parameters which establish the physical channel as carried by dedicated control signalling applied to the physical channel, encoding the detected parameters according to the encoding procedure, reconstructing an unchanged cell reference signal for carrying the encoded detected parameters, prior to physical channel estimation, removing the modified phases by comparing the modified cell reference signal received in the second slot with the reconstructed unchanged cell reference signal;

receiving the first slot and the second slot of the radio subframe by the interfered user device, the interfered user device:

obtaining the encoded values by comparing the phases of the cell reference signals included in the second slot and in the first slot, for assisting in interference cancellation of the downlink signal from the interfering base station, comparing the encoded values with parameter patterns which indicate absence of modifications in the cell reference signals, and if the encoded values are different from the parameter patterns which indicate absence of modifications in the cell reference signals, decoding the encoded values, and performing interference cancellation, using the decoded values, of the downlink signal from the interfering base station.

* * * * *